3,257,350
PROCESS FOR THE CONTINUOUS PRODUCTION OF HOMOGENEOUS RUBBER-SILICA MIXTURES
Gunther Maass, Frederico Engel, and Paul Bernemann, all of Marl, Kreis Recklinghausen, Germany, assignors to Chemische Werke Huls Aktiengesellschaft, Marl, Kreis Recklinghausen, Germany, a corporation of Germany
Filed Jan. 8, 1962, Ser. No. 164,664
Claims priority, application Germany, Jan. 12, 1961, C 23,152
3 Claims. (Cl. 260—33.6)

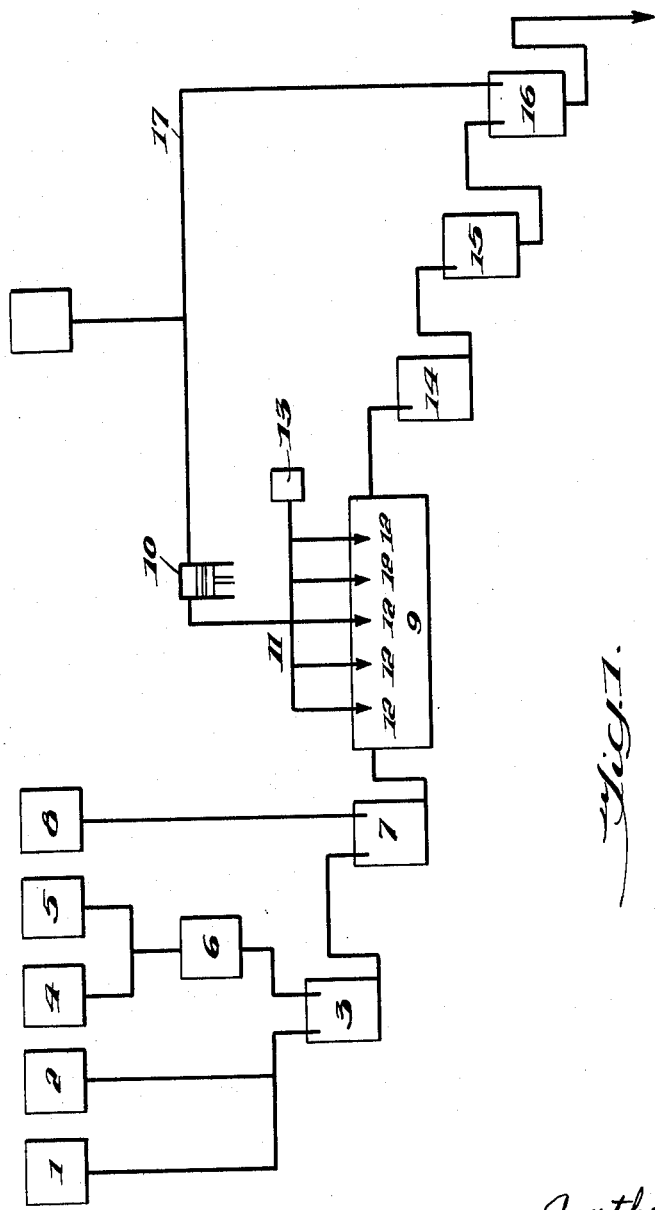

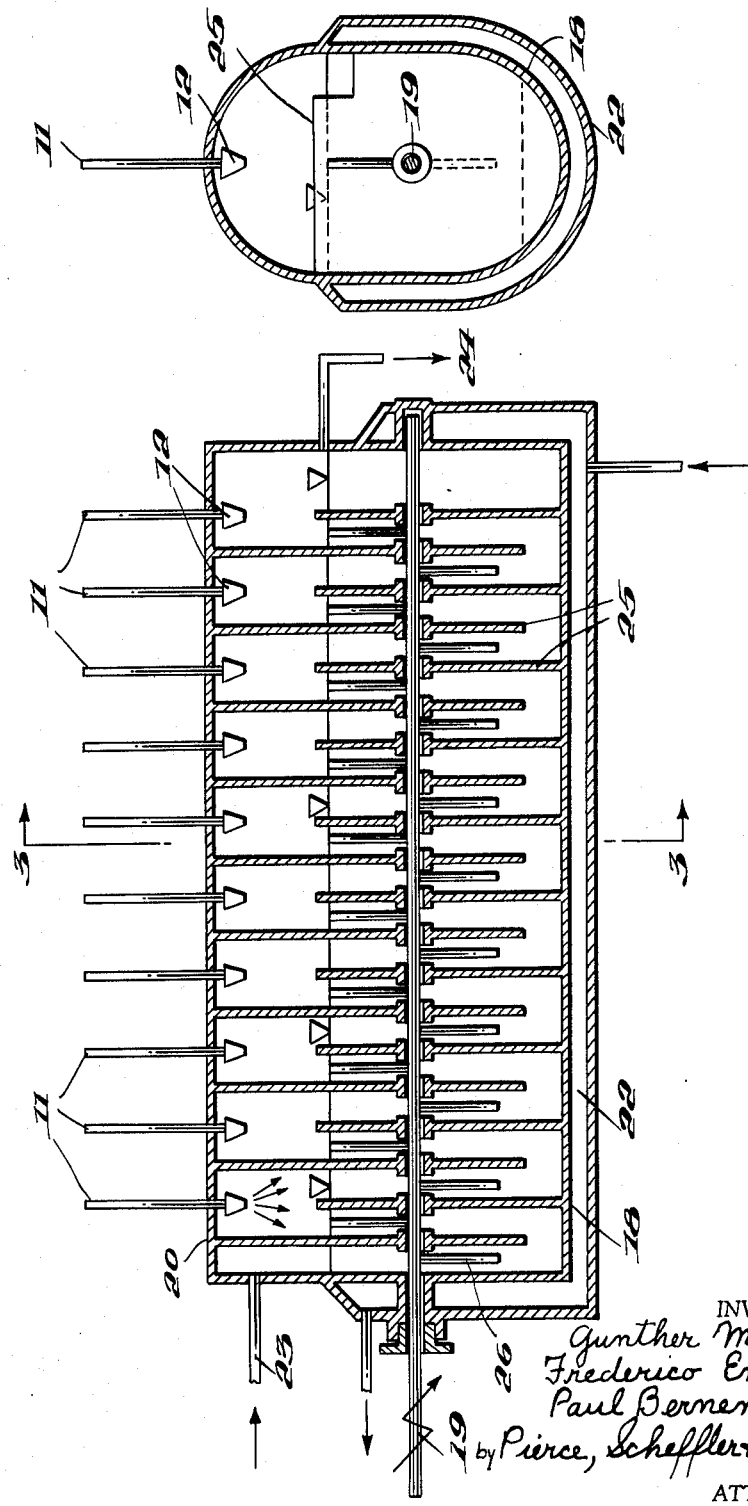

It has been proposed to produce homogeneous rubber-silica mixtures by the joint precipitation of synthetic rubber latex and alkali metal silicate solution in the presence of a neutral electrolyte by the addition of an acid. In this process it was proposed to use a creamable latex containing an emulsifying agent which is stable only in alkaline environment with the desired amount of alkali metal silicate solution and such an amount of aqueous neutral electrolyte solution that the electrolyte concentration is within the range from 25 to 80 grams per liter and preferably within the range from 40 to 60 grams per liter in the resulting cream. This cream is held at a temperature within the range from 0° to 30° C. and mixed with acid to a pH value between 9 and 7 in a period of from 10 to 180 minutes under intensive stirring. When the acid addition time is short the electrolyte concentration should be near the upper limit of the specified range. Possibly the reaction mixture produced as described is heated at from 80° to 100° C. for from 10 to 120 minutes and then possibly brought to a pH value of from 3 to 2 by further addition of acid and the resulting precipitated product is filtered, washed and dried in the well known way. By the addition of aqueous oil emulsions to the latex or to the suspension it is possible to make homogeneous oil-extended rubber-silica mixtures.

It has been proposed further to carry out the precipitation continuously by conducting the suspension through a series of vessels in which the individual steps of the precipitation are carried out one after the other. To this end the mixture of latex, alkali metal silicate solution (waterglass) and electrolyte is passed through a series of stirring vessels arranged in sequence to which, from time to time, a part of the necessary amount of acid is added. This process has however the following important disadvantages. After the introduction of from one-third to one-half of the amount of acid required to reach a pH value of from 9 to 7 the suspension becomes highly viscous to semifluid and its flow or transfer from one vessel to the next becomes very difficult. A further disadvantage is the large amount of space required for such an installation and the large number of driving devices for the stirring vessels.

It has now been found that the process for the production of homogeneous, and if, desired, oil-extended rubber-silica mixtures can be carried out advantageously by the joint precipitation of synthetic rubber latex, which may contain an oil, and alkali metal silicate solution in the presence of a neutral electrolyte with acid by flowing the reaction mixture through an elongated reaction vessel which is divided into a number of compartments, the acid being added as required to the compartments.

The process is shown in detail in the accompanying drawings in which

FIG. 1 is a diagrammatic representation of the apparatus,

FIG. 2 is an axial section in a vertical plane of a specific embodiment of apparatus and FIG. 3 is a section on the line 3—3 of FIG. 2.

Referring to the drawings 1 and 2 are storage vessels for the water glass and the latex respectively from which measured amounts may be delivered to the stirring vessel 3. For the production of oil-extended mixtures an oil emulsion, stored in the vessel 4 and emulsifying agent stored in the vessel 5 are delivered into the mixer 6, e.g., a disintegrator and from there into the stirring vessel 3. The overflow from the vessel 3 flows into the stirring vessel 7 where the electrolyte solution is added from the storage vessel 8. The cream of latex, water glass (with or without oil emulsion) and electrolyte solution flows from vessel 7 to the reactor 9 in which the acid is introduced by means of the dosing or measuring pump 10, the distributor system 11 and the nozzles 12. To safeguard against an overpressure in the pipe system an overload valve 13 is provided. After flowing through the reactor 9 the suspension flows to the vessel 14 where its pH value is checked. The suspension then flows to the heated stirring vessel 15 then to the stirring vessel 16 where its pH value is adjusted to between 2 and 3 by the addition of acid by way of the pipe 17. The resulting mixture formed in the vessel 16 may then be treated continuously in the customary manner which is not illustrated in the drawing, i.e., filtered (revolving cell filter or bowl centrifuge), washed and dried.

The construction and operation of the reactor 9 is of decisive importance for obtaining a homogeneous precipitation. The reactor is illustrated in FIGS. 2 and 3. The reactor consists of an elongated trough 18 having a stirrer shaft 19 carrying the stirrer arms 26, a cover 20, a cooling jacket 22, an inlet 23, an outlet 24 and partitions 25. The nozzles 12 extend through and are supported by the cover 20. The size of the reactor will depend upon the amount of suspension to be treated and the desired treating time. As appears from FIGS. 2 and 3 the reactor is divided into a series of double compartments by the partitions 25 which have openings at the tops and bottoms of alternate partitions to cause the suspension to follow in a tortuous or zig zag path through the reactor, there being one nozzle 12 for each double compartment and one stirrer arm 26 for each compartment. The number of double compartments is optional but should be not less than six. The stirrer arms are of any suitable design preferably for high speed. The individual compartments are so connected with each other that the liquid flows alternately under and over the partitions. The passageways between compartments must not be so large as to give a uniform pH value throughout the reactor which would be detrimental to the precipitation. On the other hand the passageways must not be so small as to prevent the free passage of the suspension through the reactor. It has been found that the size of each passageway should be within the range from 1 to 20% of the area of the partition in which it is located. In order to insure a uniform flow out of the reactor, the last compartment from which the liquid is discharged is not provided with either a stirrer arm or an acid nozzle.

It has been found further that by limiting the passageways to from 1 to 8% and preferably to from 4 to 8% of the area of the partition homogeneous precipitates are obtained even at lower electrolyte concentrations than with corresponding discontinuous precipitation. That is at temperatures of from 15° to 30° C. the precipitation can be carried out up to a pH of from 9 to 7 with a stay-time in the reactor of from 10 to 180 minutes and at an electrolyte concentration of from 25 to 45 g./l. but at shorter stay-times in the reactor the electrolyte concentration must be near the upper limit of the specified range.

The invention is illustrated by the following specific example:

Into a reactor as shown in FIG. 2 which is 53 cm. long, not counting the chamber at the end without the stirrer which is 2.5 cm. long, and 10 cm. wide and has a volume capacity of 4.7 1. a mixture is continuously supplied as follows:

10 1/h of a synthetic rubber latex formed of a butadiene-styrene polymerizate in the ratio 76:24 and having a solids content of 21.5% with an emulsifier consisting of a mixture of equal parts of the potassium salts of fatty acids and disproportionated resin acids;

3.76 1/h of water glass having an $Na_2O:SiO_2$ ratio of 1:3.3 and containing 21.3% of silicic acid, 5.16 1/h of a 13.9% sodium chloride solution.

The concentration of the starting dispersion is 41.7 g. of sodium chloride per liter, 53.1 g. of silicic acid per liter and 112.8 g. of rubber (solid) per liter. The stay-time in the reactor is 11.3 minutes. At a temperature of from 18° to 19° C., 6.56 1 of 1.5 normal sulfuric acid per hour is introduced through the nozzles 12 distributed uniformly over the length of the reactor whereby the pH value in the vessel 14 of from 8.2 to 8.3 will be maintained. The stay-time of the suspension in the vessel 15 is 15 minutes at 90° C. and the stay-time in the stirring vessel 16 in which the pH value is maintained at 2 by the addition of 1.5 normal sulfuric acid is 15 minutes. After filtering, washing and drying a finely powdered homogeneous mixture of rubber and silica is obtained which contains 32% of silica. The yield is 3.1 kg. of this product per hour. In the foregoing example the percentages are by weight.

We claim:

1. Process for the continuous production of a homogeneous composition of synthetic rubber and silica which comprises passing a mixture comprising a latex of a synthetic rubber, an alkali metal silicate solution and a neutral alkali metal cation electrolyte continuously through a series of at least six interconnected compartments, stirring said mixture in said compartments, adding acid in substantially equal amounts to said mixture in said compartments in total quantity sufficient to bring the mixture to a pH value of from 9 to 7 before the reaction mixture leaves said compartments, withdrawing the mixture from said compartments, heating the mixture at from 80° to 100° C. and holding it at this temperature for from 10 to 120 minutes, adjusting the pH value of the mixture to from 3 to 2, and filtering, washing and drying the resulting precipitate.

2. Process as defined in claim 1 in which the mixture comprises an oil emulsion.

3. Process as defined in claim 1 in which the mixture is maintained at a temperature of from 15 to 30° C. and the neutral electrolyte concentration is maintained at from 25 to 45 grams per liter and the treating time is maintained at from 10 to 180 minutes.

References Cited by the Examiner

UNITED STATES PATENTS

| | | | |
|---|---|---|---|
| 1,745,291 | 1/1930 | Bleil | 259—9 |
| 2,125,455 | 8/1938 | McLean | 259—9 |
| 2,485,287 | 10/1949 | Henson et al. | 260—41 |
| 2,899,401 | 4/1959 | Eby | 260—33.6 |
| 3,019,207 | 1/1962 | Crane | 260—33.6 |
| 3,108,982 | 10/1963 | Barclay. | |

FOREIGN PATENTS 767,681  2/1957  Great Britain.

OTHER REFERENCES

G. S. Whitby: "Synthetic Rubber," John Wiley and Sons, 1954, New York, pp. 676–77.

MORRIS LIEBMAN, *Primary Examiner.*

D. W. ERICKSON, J. E. CALLAGHAN,
*Assistant Examiners.*